United States Patent
Wohletz et al.

(10) Patent No.: US 12,475,174 B1
(45) Date of Patent: Nov. 18, 2025

(54) SYSTEMS AND METHODS FOR PROVISIONING ACCESS TO ELECTRONIC FILES ASSOCIATED WITH INDUSTRIAL EQUIPMENT

(71) Applicant: Automatic Systems, Inc., Kansas City, MO (US)

(72) Inventors: Michael Gerard Wohletz, Kansas City, MO (US); Timothy Scott Burdick, Raymore, MO (US)

(73) Assignee: Automatic Systems, Inc., Kansas City, MO (US)

( * ) Notice: Subject to any disclaimer, the term of this patent is extended or adjusted under 35 U.S.C. 154(b) by 0 days.

(21) Appl. No.: 18/898,894

(22) Filed: Sep. 27, 2024

Related U.S. Application Data

(60) Provisional application No. 63/586,628, filed on Sep. 29, 2023.

(51) Int. Cl.
| | |
|---|---|
| *G06F 16/00* | (2019.01) |
| *G06F 16/93* | (2019.01) |
| *G06K 7/10* | (2006.01) |
| *G06K 7/14* | (2006.01) |

(52) U.S. Cl.
CPC ........ *G06F 16/93* (2019.01); *G06K 7/10297* (2013.01); *G06K 7/1413* (2013.01); *G06K 7/1417* (2013.01)

(58) Field of Classification Search
None
See application file for complete search history.

(56) References Cited

U.S. PATENT DOCUMENTS

| | | | | |
|---|---|---|---|---|
| 2011/0078074 | A1* | 3/2011 | Lipman | G06Q 20/10 705/347 |
| 2014/0263247 | A1* | 9/2014 | Hillen | H04B 5/24 219/136 |
| 2014/0279443 | A1* | 9/2014 | Neeley | G06V 10/75 702/188 |
| 2015/0310188 | A1* | 10/2015 | Ford | H04L 63/101 726/28 |
| 2016/0253675 | A1* | 9/2016 | Remillet | G06T 7/579 705/44 |
| 2018/0332114 | A1* | 11/2018 | Oak | H04L 67/10 |
| 2020/0104547 | A1* | 4/2020 | Vermunt | G06Q 10/08 |
| 2020/0143120 | A1* | 5/2020 | Nguyen | G06K 7/10297 |
| 2020/0279320 | A1* | 9/2020 | Stewart | H04N 21/23614 |

FOREIGN PATENT DOCUMENTS

JP 3036918 B2 * 4/2000

* cited by examiner

*Primary Examiner* — Hasanul Mobin
(74) *Attorney, Agent, or Firm* — Frost Brown Todd LLP

(57) ABSTRACT

Systems and methods are provided to provide quick and easy access to a variety of electronic files associated with pieces of industrial equipment that are located within a physical environment, such as a manufacturing facility, processing plant, or various other industrial facilities. Each piece of industrial equipment can be associated with a variety of electronic files providing information related to the equipment, such as CAD files. A mobile communications device can be used to scan a tag that is coupled to a piece of industrial equipment and the electronic files for that piece of industrial equipment can be displayed on the mobile communications device.

18 Claims, 5 Drawing Sheets

Mobile Communications Device — 220

Scan Results

Plate # 7ZQ2HF

| | |
|---|---|
| Serial Number | 11268-429 |
| Order Number | 11268-01PRB-013 |
| Description | Skid 01 Roll Bed, Normal-Class 4 (hd), Power Roll Bed Assembly, T-800, 6 Roll, L=6160, H=500, Belt Covers, Med. Speed Short Ramp |
| Mark Number | 01-A-080-6-616-1BR-00130-1A6 |
| Drawing Number | 01-A-080-6-616-1BR-00130-1A6 |
| Production Year | 2023 |
| MAA | |

— 236

3D Model https://mode.asi.com/part-viewer/
01-A-080-6-616-1BR-00130-1A6.dwg/

— 238

Access 3D Model — 240

— 218

Industrial Equipment — 230

| | |
|---|---|
| Drawing: | 01-A-080-6-616-1BR-00130-1A6 |
| Serial No: | 11268-0429 |
| Prod Year: | 2023 |
| MAB04461S | |

SYSTEMS AND METHODS FOR PROVISIONING ACCESS TO ELECTRONIC FILES ASSOCIATED WITH INDUSTRIAL EQUIPMENT

CROSS-REFERENCE TO RELATED APPLICATIONS

This application claims the benefit of U.S. Ser. No. 63/586,628, filed on Sep. 29, 2023, entitled SYSTEMS AND METHODS FOR PROVISIONING ACCESS TO ELECTRONIC FILES ASSOCIATED WITH INDUSTRIAL EQUIPMENT, the disclosure of which is incorporated herein in its entirety.

BACKGROUND

Industrial environments such as manufacturing plants, assembly facilities, and logistics centers utilize a wide range of complex machinery and equipment. Over time, various components and parts of the industrial equipment require servicing, repair, or replacement. However, locating the appropriate technical documentation for the specific equipment can be challenging in large industrial settings that contain hundreds or thousands of machines from various manufacturers.

The technical documentation for the equipment, such as service manuals, parts diagrams, and computer-aided design (CAD) files, may be stored in decentralized locations or inconsistent formats across an organization. In addition, the documentation may not be updated to reflect the latest configurations of the installed equipment, leading to significant inaccuracies between the documents and physical machines. Accessing accurate and up-to-date documentation is critical for maintenance workers to correctly service and operate the equipment.

Without centralized and organized technical files, there is a risk of inefficient maintenance and increased downtime. Many industrial organizations currently lack systems to consolidate technical files and make the up-to-date documents readily accessible to authorized personnel. Therefore, there is a need for an improved system to manage industrial equipment documentation and provision access to the correct files for servicing, repairing, and operating the machinery.

BRIEF DESCRIPTION OF THE DRAWINGS

It is believed that certain embodiments will be better understood from the following description taken in conjunction with the accompanying drawings in which:

FIG. 2 schematically depicts a mobile communications device accessing equipment information based on the scanning of an equipment tag, in accordance with one non-limiting embodiment;

DETAILED DESCRIPTION

Figure 1:
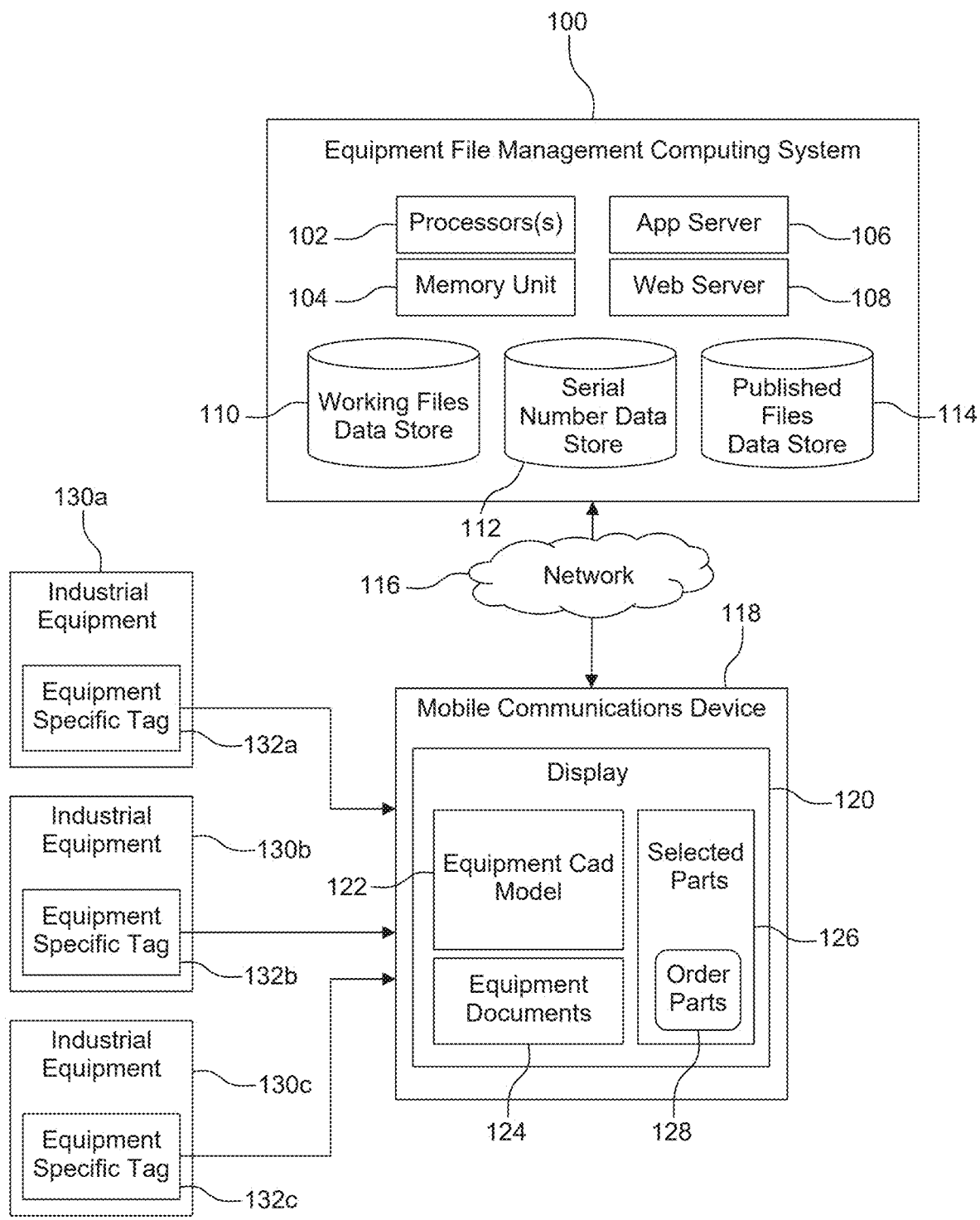
FIG. 1 depicts an example equipment file management computing system in communication with a mobile communications device, in accordance with one non-limiting embodiment.

Various non-limiting embodiments of the present disclosure will now be described to provide an overall understanding of the principles of the structure, function, and use of electronic file management systems and methods, as disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including, but not limited to, machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented, but, instead, may be performed in a different order or in parallel.

Embodiments of the electronic file management systems and methods described herein can generally allow users, such as maintenance personnel, technicians, and the like, quick and easy access to a variety of electronic files associated with a physical piece of industrial equipment. Such industrial equipment can include, without limitation, belt systems, conveyor systems, rollers systems, skillet systems, tow systems, robotic systems, as well as a wide variety of other material handling and manufacturing equipment, including guided vehicle systems and electrified monorail systems. Each piece of industrial equipment can be associated with a variety of electronic documents, including CAD models (2D or 3D), as well as a variety of other electronic files providing information related to the equipment. As such, a particular piece of equipment installed in an industrial setting may be associated with a 3D CAD model, which includes all of the individual parts of the equipment, as well as a variety of other files (such as .PDF files or .XLS files) that provide certain information regarding that piece of equipment, such as calibration data, repair instructions, operating instructions and so forth.

The systems and methods in accordance with the present disclosure can give an authorized user real-time access to the electronic files through a mobile communications device operated by the user. Electronic files associated with industrial equipment, however, may be updated overtime, such as through subsequent versions, newly released files, and so forth. As such, the particular electronic files provided to the user can be controlled such that the user automatically receives the most up-to-date versions of the documents that are available, assuming the files have been specifically approved for publication. Notably, while the user has access to the files, they do not necessarily have permission to submit edits or otherwise change the data in the electronic file that they are provided by the system.

In some embodiments, the user can interact with a 3D CAD model, or other electronic parts repository, and select specific parts of the equipment. Then, through interactions with their mobile communications devices, the user can submit a request to order replacements for the selected parts. Thus, the process for accurately identifying and ordering parts for replacement purposes is streamlined and efficient. Moreover, as the 3D CAD model may provide an extremely high level of granularity regarding the various parts of the equipment, a selected component may not be individually replaceable. In such situations, the system can automatically transverse up the selected component to its parent part, which can then be identified on the parts request submission. As provided in more detail below with regard to FIG. 5, for example, a series of job processors can be routinely executed to automatically ensure that the proper versions of the electronic files are provided to the authorized users, based on various metadata associated with the lifecycle of the files maintained by the system.

As is to be appreciated, the systems and methods of the present disclosure address critical technical challenges in the field of CAD file management for industrial equipment. Conventional systems struggle with maintaining and distributing up-to-date CAD files across multiple users and locations, ensuring all users have access to the most recent versions, preventing premature access to updated files before official approval, and maintaining file integrity by restricting unauthorized modifications. To solve these problems, the platform described herein provides a CAD file management and distribution architecture that implements a unique combination of version control, access management, file integrity preservation mechanisms, and interactive functionality for parts ordering.

The implementation of this system results in several tangible technical improvements. It increases data consistency across the system, as all users always access the most up-to-date published version of CAD files. The system's reliability is enhanced through the prevention of unauthorized or premature file access, while data integrity is improved by eliminating the possibility of unintended or unauthorized modifications to CAD files. Network resource utilization is optimized through intelligent file distribution mechanisms, and overall system security is strengthened through multi-layered access controls and file integrity measures. Furthermore, the interactive parts selection feature significantly enhances the practical utility of the system, streamlining the process from CAD file review to parts procurement in a secure, controlled environment. These improvements collectively result in a more efficient, secure, and reliable CAD file management system, representing a significant advancement over conventional technologies in this field. By addressing specific technical problems with a sophisticated, multi-layered solution that includes practical, interactive functionality, the present disclosure provides concrete improvements in computer functionality and CAD file management technology. The system's architecture, the resulting technical effects, and the integration of user interaction for parts selection demonstrate a practical application that enhances the capabilities of computer systems in managing and distributing CAD files for industrial equipment.

Referring now to FIG. 1, an example equipment file management computing system 100 in communication with a mobile communications device 118 is depicted, in accordance with one non-limiting embodiment. The equipment file management computing system 100 can be provided using a processor-based device or system specially configured to provide the services described herein. The equipment file management computing system 100 can include one or more processors 102 and one or more computer memory units 104. For convenience, only one processor 102 and only one memory unit 104 are shown in FIG. 1. The processor 102 can execute software instructions stored on the memory unit 104. The processor 102 can be implemented as an integrated circuit (IC) having one or multiple cores. The memory unit 104 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example. Embodiments of the equipment file management computing system 100, or components thereof, can also be implemented in cloud computing environments. "Cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In some embodiments, a web server 108 can provide a graphical web user interface through which various users or entities can interact with the equipment file management computing system 100 via a communications network 116. The server 108 can accept requests, such as HTTP requests, from clients and serve the clients' responses. In some embodiments, an app server 106 can provide a user interface for users or entities that do not communicate with the equipment file management computing system 100 using a web browser. Such users can have, for example, specialized software installed on their mobile communications device 118 that allows them to communicate with the equipment file management computing system 100 via the communications network 116, for example. In some embodiments, the equipment file management computing system 100 can include various data stores, either locally or remotely. Such data stores can include a working files data store 110, a serial number data store 112, and a published files data store 114. As described in more detail below, users communicating with the equipment file management computing system 100 seeking access to electronic files can be permitted to only view, or otherwise interact with, files from the published files data store 114. Files available for real-time consumption by users can be strictly controlled and managed in accordance with the present disclosure.

As schematically shown in FIG. 1, pieces of industrial equipment 130A-C are illustrated. While this disclosure is not limited to any particular type of industrial equipment, each piece of industrial equipment 130A-C illustrated in FIG. 1 can be a belt system, a conveyor system, a rollers system, a skillet system, a tow system, a robotic system, or any other type of material handling or manufacturing equipment. In any event, the industrial equipment 130A-C can each be associated with an equipment-specific tag 132A-C. The number of tags associated with each piece of equipment may vary depending on, for example, the complexity and size of the machinery. For instance, a simple conveyor belt might require only a single tag, while a complex robotic assembly system might necessitate multiple tags to adequately cover all its components and subsystems. In some embodiments, the equipment-specific tags 132A-C are stickers that are adhered to a surface of the respective piece of industrial equipment, although this disclosure is not so limited. In some embodiments, the equipment-specific tags 132A-C can be a placard riveted to the equipment or a hanging tag, for example. In other embodiments, the equipment-specific tags 132A-C can be engraved or printed directly onto the industrial equipment. The equipment-specific tags 132A-C can be designed to be durable and easily identifiable in the often harsh conditions of industrial environments.

The equipment-specific tag 132A-C can include a portion that is readable or scannable by a mobile communications device 118 or can otherwise be entered into the mobile communications device 118. While certain equipment-specific tags described herein utilize a Quick Response (QR) code, this disclosure is not so limited. Instead, the system is designed to be flexible and adaptable to various identification technologies, including but not limited to: Radio-Frequency Identification (RFID), where active or passive RFID tags could be employed for contactless reading, particularly useful in environments where line-of-sight scanning might be challenging; Near-Field Communication (NFC), for close-range identification, allowing for simple tap-to-identify functionality with compatible mobile devices; Barcodes, including traditional one-dimensional barcodes or more advanced two-dimensional variants like Data Matrix codes as alternatives to QR codes; Bluetooth Low Energy (BLE) Beacons, for scenarios requiring longer-range identification or real-time location tracking; and Optical Character Recognition (OCR), where in some cases, human-readable alphanumeric codes designed for machine reading via OCR technology could be employed. The choice of identification technology can be tailored to the specific needs of the industrial environment, considering factors such as read range, data capacity, durability, and compatibility with existing systems.

An authorized user desiring to access files associated with a particular piece of industrial equipment 130A-C can scan the equipment-specific tag 132A-C with their mobile communications device 118. This scanning process can utilize various technologies depending on the type of tag employed, such as optical scanning for QR codes or barcodes, or wireless reading for RFID or NFC tags. In some embodiments, the user can interact with the equipment file management computing system 100 via a website presented by a web browser application executing on the mobile communications device 118, while in other embodiments the user can utilize a specific mobile application installed on their mobile communications device 118. The mobile communications device 118 can be any suitable device that is configured for network communications, such as a smartphone, a tablet computer, a laptop computer, or other type of handheld or portable computer. Regardless of the device or interface used, the system can implement authentication and authorization protocols to ensure that only users with appropriate permissions can access equipment files associated with the industrial equipment 130A-C. This may involve multi-factor authentication, role-based access control, and encryption of data both in transit and at rest. The equipment file management computing system 100 can also log all access attempts and file interactions for security and auditing purposes, maintaining a comprehensive trail of user activities related to equipment file management.

As schematically shown in FIG. 1, a display 120 of the mobile communications device 118 can provide a user interface to the user that can provide the user with various functionality. For example, the user can interact with a CAD model 122 for the specific piece of industrial equipment 130A-C using a CAD viewer integrated into the website. The user can also access one or more equipment documents 124 for the specific piece of industrial equipment 130A-C. In some embodiments, the user can select certain parts from the CAD model 122 and create a list of selected parts 126. The user can then submit a request to a parts ordering system to procure the parts through an order parts request 128. Beneficially, the user is able to access and interact with these up-to-date documents in-situ and request replacement parts through interactions with their mobile communications device 118.

FIG. 2 schematically depicts a mobile communications device 218 accessing equipment information based on the scanning of an equipment tag 232, in accordance with one embodiment. In this example embodiment, the equipment tag 232 is a sticker adhered to industrial equipment 230. It is noted that such equipment tag 232 can be attached to the industrial equipment 230 at the time of manufacture or can be attached to industrial equipment that has previously been installed. As shown, in this embodiment the equipment tag 232 indicates the specific drawing number, serial number, and production year for the industrial equipment 230 to which it is attached. The equipment tag 232 also includes a QR code that can be scanned by the camera on the mobile communications device 218. Upon scanning the QR code, equipment-specific information 236 related to the industrial equipment 230 can be presented on the display 220 of the mobile communications device 218. Example equipment-specific information 236 can include serial number, order number, and a description of the industrial equipment 230. The display 220 can also indicate a 3D model 238 is available for the industrial equipment 230. In some embodiments, an interactive icon 240 is presented which, when activated, presents the 3D model to the user.

Figure 3:
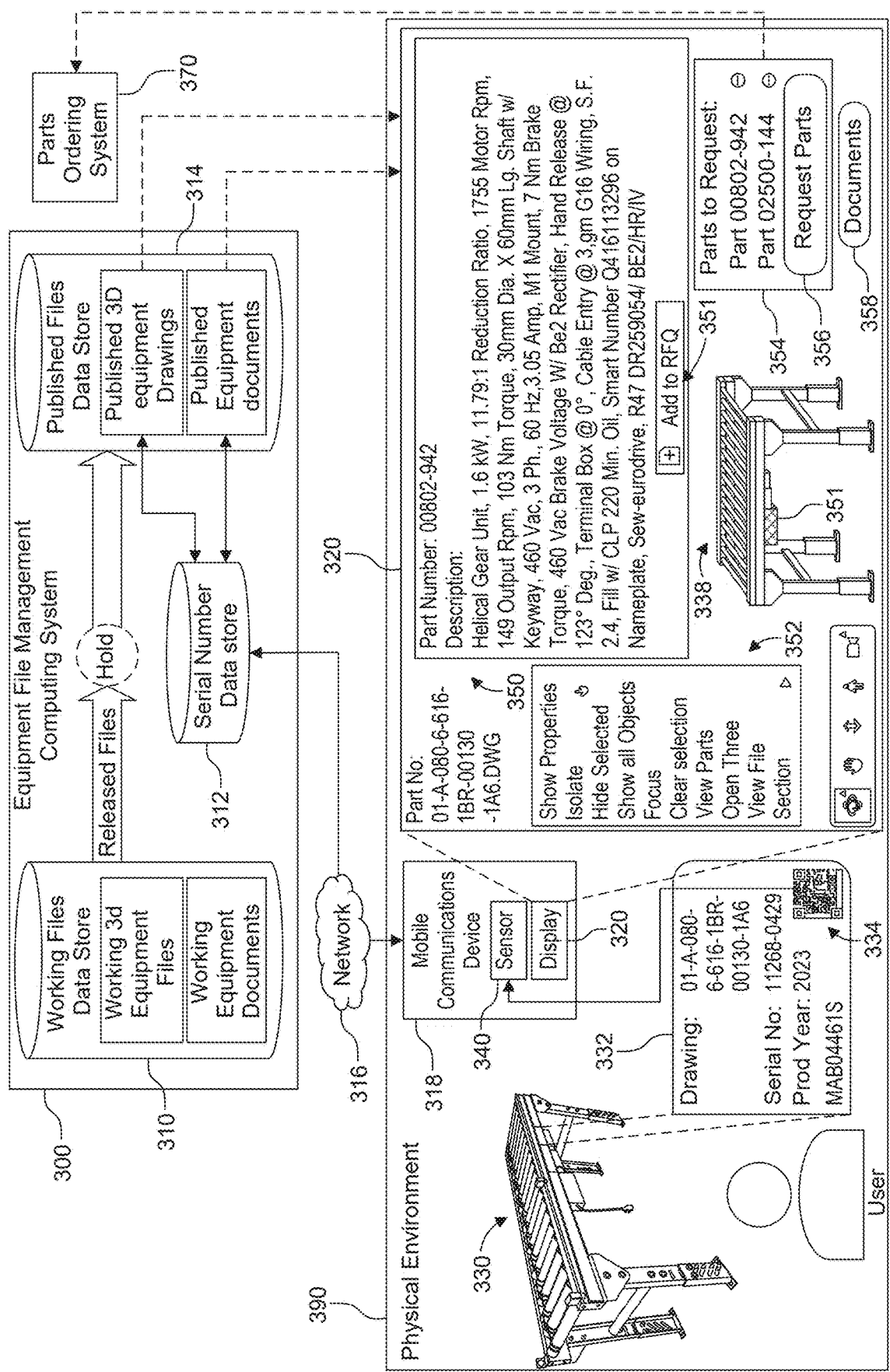
FIG. 3 depicts another example equipment file management computing system in communication with a mobile communications device located proximate to industrial equipment within a physical environment, in accordance with one non-limiting embodiment.

Referring now to FIG. 3, a user's interaction with an equipment file management computing system 300 is schematically depicted. The user is located within a physical environment 390 proximate to a piece of industrial equipment 330. An equipment tag 332, which includes a QR code 334 in this embodiment, is affixed to the industrial equipment 330. The user can scan the equipment tag 332 with a sensor 340 of a mobile communications device 318. In some embodiments, the sensor 340 is an optical sensor, although this disclosure is not so limited. The mobile communications device 318 can communicate with the equipment file management computing system 300 through a network 316.

The equipment file management computing system 300 can incorporate a data storage architecture to efficiently manage and organize the various files and information associated with industrial equipment. While FIG. 3 schematically shows the data stores local to the file management computing system 300, it is to be appreciated that some of the data stores may be considered remote, distributed, or cloud-based storage locations. In some embodiments, the equipment file management computing system 300 can manage three data stores related to the systems and methods described herein, shown as a working files data store 310, a serial number data store 312, and a published files data store 314. Some of the data stores 310, 312, and 314 may be hosted locally on on-premises servers, while others may be implemented as remote or cloud-based storage locations, or a hybrid combination of both. This flexibility can allow for improved scalability, enhanced data redundancy, and optimized access speeds based on geographic location.

The working files data store 310 can maintain files associated with various industrial equipment, such as 3D equipment files (.DWG, .STP, etc.) as well as other types of equipment documents (.PDF, .XLS, .DOCX, etc.). Each of the files can be associated with various metadata, which can include states that can be manually controlled (i.e., "released", "work in progress", etc.) as well as states that are automatically updated based on a user's interaction with the document (i.e. "edit date", "upload date", etc.).

The published files data store 314 can maintain files associated with various industrial equipment, such as the 3D equipment files and the other types of equipment documents that have been approved for publication to authorized users. Notably, it is the files that are maintained by the published files data store 314 that can be provided to the user via the mobile communications device 318, while the files in the working files data store 310 are inaccessible and maintained beyond a firewall.

The serial number data store 312 can contain linking information to correlate the information scanned on the equipment tag 332 to the specific files maintained in the published files data store 314 that are related to the specific piece of industrial equipment associated with the equipment tag 332. Thus, the incoming communication received from the mobile communications device 318 can include, for example, a particular serial number for a piece of industrial equipment. Based on that serial number, the file management computing system 300 can utilize the serial number data store 312 to identify all the files in the published files data store 314 related to that serial number.

Files maintained in the working files data store 310 can be selectively released for publication. In some embodiments, a holding period is introduced into the release cycle, as is schematically shown in FIG. 3. While the time period of the holding period can vary, in some embodiments the holding period is 10 days. Thus, in some embodiments, when a system user of the equipment file management computing system 300 affirms that a particular file is ready to be released, the system will wait 10 days before the file is available in the published files data store 314. This holding period can allow the system user to un-release the file prior to publication, in the event the file was inadvertently released, for example. While a holding period of 10 days is depicted for illustration purposes, in some embodiments the holding period may be less than 10 days (such as 1 day) or greater than 10 days. Any suitable holding period may be implemented.

Referring again to the mobile communications device 318, subsequent to scanning the equipment tag 332, a user interface can be presented on the display 320 that provides various information and functionality to the user. As schematically shown, the display 320 can present a manipulatable 3D CAD model 338 of the industrial equipment 330. The display 320 can also provide the user with the ability to view documents 358 associated with the of the industrial equipment 330. The documents 358 can be, for example, any information materials, such as user manuals, maintenance instructions, assembly instructions, manufacturing information, and so forth. The documents 358 can also include, for example, video or audio files. The 3D CAD model 338 and other documents 358 can be retrieved from the published files data store 314, as the user does not have access to the working files data store 310. The user can also be presented with various control features 352 that allows them to interact with and manipulate the 3D CAD model 338. Thus, the user can rotate the 3D CAD model 338, hide certain parts, isolate certain parts, etc.

The user can also select certain parts, as shown by part selection 351. Upon the selection of a part, a part information window 350 can be presented to the user of the mobile communications device 318. In some embodiments an "Add to RFQ" interactive icon 351, or other suitable icon or feature, can be presented to the user, which the user can activate to indicate they want to order that particular part. The part can then be added to a listing 354 of parts to be requested. Once the listing 354 is complete, the user can activate a request parts interactive icon 356 to submit the parts request process to a parts ordering system 370.

As noted above, the 3D CAD model 338 can provide a high level of granularity with regard to the various parts of the equipment, and a selected component may not be individually replaceable through the parts ordering process. In such situations, upon a user selecting a sub-component that is not individually replaceable, the system can automatically transverse up the sub-component to its parent part that is replaceable. The request submitted to the parts ordering system 370 can identify the parent part.

Figure 4:
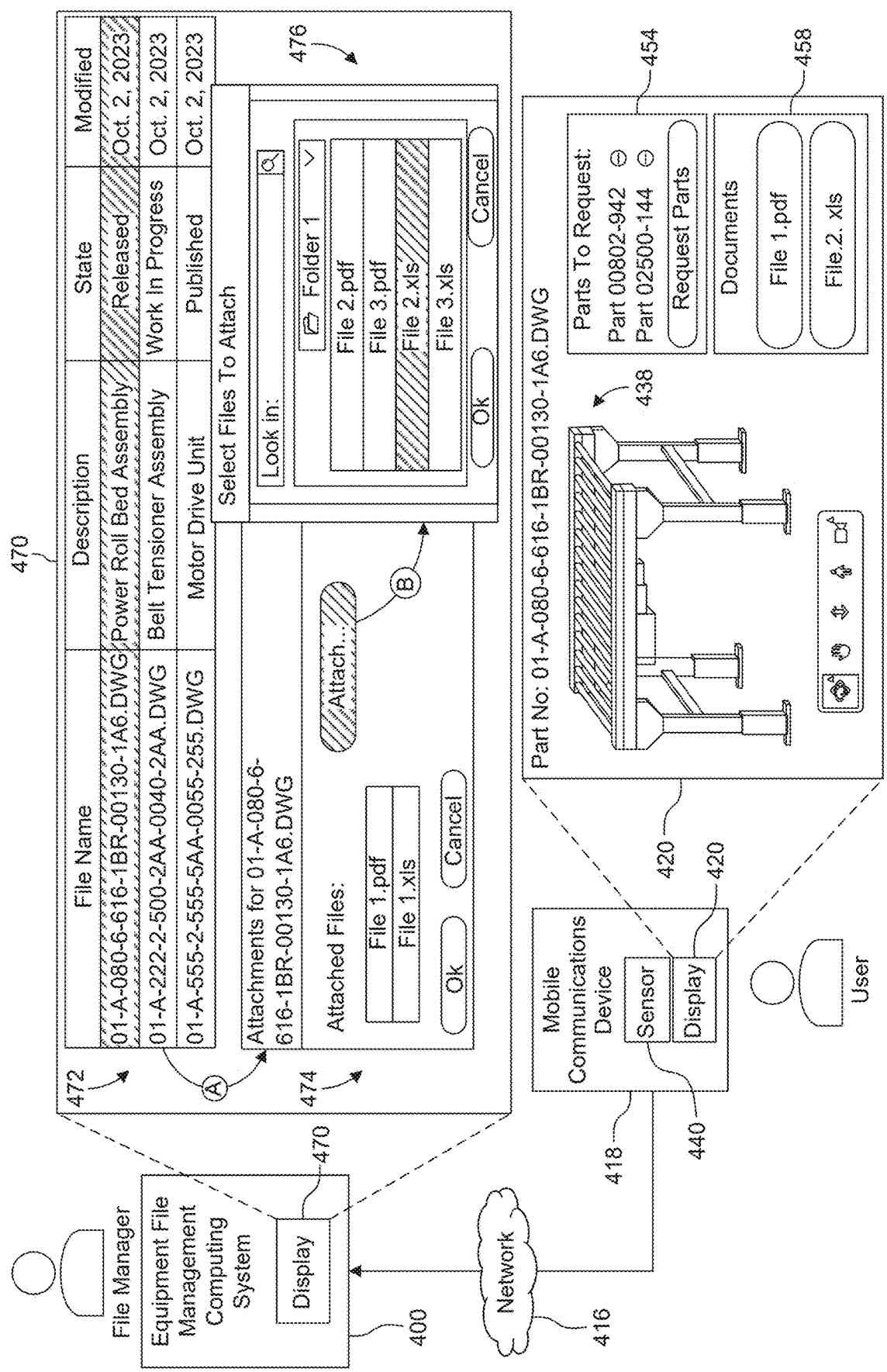
FIG. 4 depicts an example file management interface of an example equipment file management computing system, in accordance with one non-limiting embodiment.

Referring now to FIG. 4, an example file management interface 470 of an example equipment file management computing system 400 is depicted. Similar to other embodiments described herein, a user can use a mobile communications device 418 to communicate with the file management computing system 400 via communications through a network 416. The user can scan an equipment tag using a sensor 440 on their mobile communications device 418 to access various documents associated with a piece of industrial equipment, which can be presented on the display 420, as described above. As shown in FIG. 4, the display 420 can present, for example, a 3D CAD model 438 and a parts request listing 454. The display 420 can also provide a document listing 458, which is schematically shown to include a .PDF file and a .XLS file.

Through interactions with the file management interface 470, a file manager can determine which documents are to be included in the document listing 458. As schematically shown, the file management interface 470 can be presented on a display 470 of the equipment file management computing system 400. The file management interface 470 can provide a drawing listing 472 of various CAD files maintained by a working files data store. The drawing listing 472 can include, for example, a description of the file as well as additional metadata. Thus, the information displayed in the drawing listing 472 can include, but is not limited to, the file description, creation date, last modification date, file size, and the name of the last user to modify the file. This detailed view enables file managers to quickly identify and select the specific CAD file they need to work with. The file manager can select a particular drawing, schematically shown by selection A, to which they wish to associate certain files. An attachment window 474 can provide the file manager with functionality to attach one or more files to the selected CAD file. The attachment window 474 shows that File 1.PDF and File 1.XLS are currently attached to the CAD file, as are presented in the document listing 458 on the display 420. Selecting an attach icon, schematically shown by selection B, can open a browsing window 476 that allows the file manager to select additional files for attachment to the CAD file.

Figure 5:
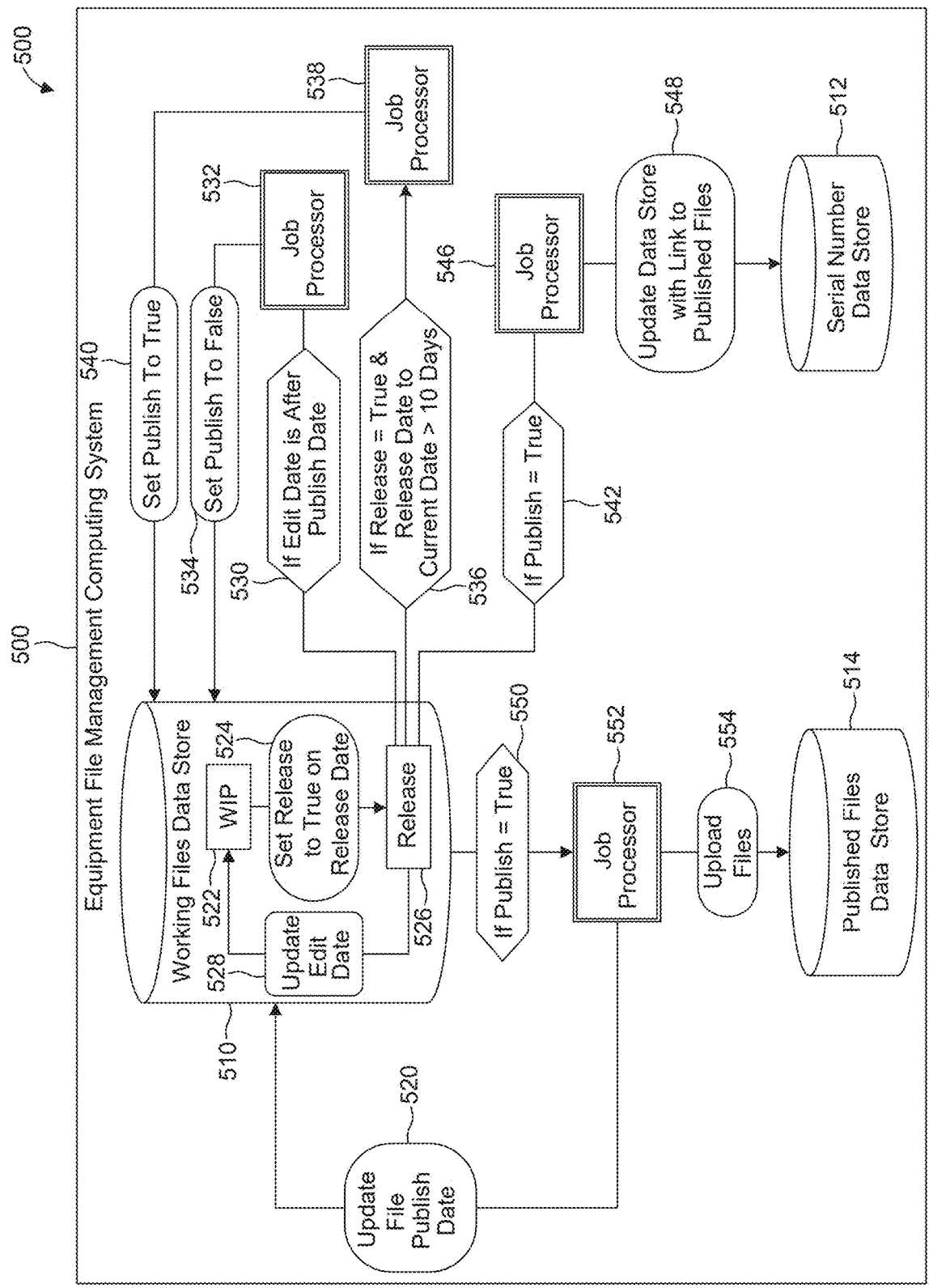
FIG. 5 depicts an example process of an example equipment file management computing system to publish files to a published file data store, in accordance with one non-limiting embodiment.

FIG. 5 depicts an example processing of an example equipment file management computing system 500 to publish files from a working files data store 510 to a published file data store 514, in accordance one non-limiting embodiment. The processing can be performed by job processors, which are schematically shown as job processors 532, 538, 546, and 552. Generally, the job processors can each be customized to perform certain tasks on a certain schedule or frequency. Based on the lifecycle status of files within the working files data store 510, the job processors 532, 538, 546, and 552 can cause certain events to automatically occur, such as publishing files to the published file data store 514 and updating the serial number data store 512. The use of job processors can ensure that users of the equipment file management computing system 500 can automatically access the most up-to-date versions of the files, subsequent to any holding periods utilized by the system.

The files maintained in the working files data store 510 can first be set to a work-in-progress (WIP) status 522. Once the file is ready for publication to the published files data store 514, the release state of the file can be set to "true" at 524, and the release date can be logged in a release date field at 526. In some embodiments, an intervening step can be used where a manager must approve the change of the state from a work-in-progress state to a release state. A job processor 538 can routinely check (1) whether the release state of any file is set to true and (2) whether 10 days (or other suitable time period) has passed since the release date. If these conditions are satisfied, the job processor 538 can change the publish state for that file to "true" to indicate the file is ready for publication to the published files data store 514. The job processor 546 can routinely check for files within the working files data store 510 that have a publish state of "true" so the serial number database 512 can update appropriately. The job processor 546 can therefore ensure that linkage between serial numbers and associated files and documents stored by the serial number database 512 is up to date, as it is this linkage that determines which files and documents are presented to a user upon scanning an equipment tag.

Job processor 552 can be configured to routinely upload files 554 to the published files data store 514 if they have a publish state of "true." As with the other job processors, the job processor 552 can be configured to execute periodically, such as every 30 seconds. Further, in some embodiments, the job processor 552 can create two separate .ZIP files for uploading, one of which has the model files and the other having the document files. The job processor 552 can also update a publish date field of each of the published files at 520.

Finally, the job processor 532 can be configured to check the edit date of each document against its publish date, and if an edit date is after the publish date it indicates that the most recent version of the file has not being published. Accordingly, when that condition is detected, the publish state for that file can be set to "false" at 534, to remove the file from the published files data store 514.

Thus, the various job processors of the equipment file management computing system 500 can enable the automated publishing of files from a working files data store to a published files data store. This automation of the system streamlines the process of file management and ensures that the most up-to-date information is consistently available to users. The job processors can execute periodically to check status and move files through the publishing process automatically once certain criteria are met. This automated functionality ensures users consistently have access to the latest file versions without manual intervention. The customization of individual job processors to handle specific tasks allows efficient and reliable file publishing and maintenance of up-to-date serial number linkages.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. In some embodiments, the drawings can be understood to be drawn to scale. The scope of the disclosure is, of course, not limited to the examples or embodiments set forth herein, but can be employed in any number of applications and equivalent devices by those of ordinary skill in the art. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. An equipment file management system, comprising:
   a plurality of physical equipment tags, wherein each of the plurality of physical equipment tags is coupled to a respective piece of industrial equipment that is positioned within an industrial environment, wherein each of the plurality of equipment tags comprises an identifier associated with the piece of industrial equipment to which it is coupled;
one or more data stores, wherein the one or more data stores maintain:
a plurality of working equipment files in a working files data store, wherein the working files data store is inaccessible to a mobile communications device operated by a maintenance user
a plurality of published equipment files in a published files data store, wherein the published files data store is accessible to the mobile communications device, and an association of each of the identifiers to one or more of the plurality of published equipment files;
an equipment management computing system in communication with the mobile communications device physically positioned proximate to the piece of industrial equipment and having a graphical user interface, wherein the equipment management computing system is configured to:
automatically move a specific file from the working files data store to the published files data store only after a predetermined holding period has passed since the specific file was designated for release, wherein the predetermined holding period allows for reversal of the designation
receive from the mobile communications device an equipment file query associated with one of the pieces of industrial equipment in the industrial environment, wherein the equipment file query comprises information from the physical equipment tag coupled to the piece of industrial equipment;
identify the piece of industrial equipment based on the information;
based on the identified industrial equipment, electronically provide one or more of the plurality of published equipment files from the published files data store to the mobile communications device for display on the graphical user interface; and
receive from the mobile communications device a request to order at least one replacement part for the identified industrial equipment.

2. The equipment file management system of claim 1, wherein files provided to the mobile communications device are provided in a read-only format.

3. The equipment file management system of claim 1, wherein the equipment tag is a physical tag.

4. The equipment file management system of claim 3, wherein the equipment tag is a sticker adhered to a surface of the piece of industrial equipment.

5. The equipment file management system of claim 3, wherein the equipment tag is a hanging tag.

6. The equipment file management system of claim 3, wherein the equipment tag is a placard fastened to the piece of industrial equipment.

7. The equipment file management system of claim 1, wherein the identifier on the equipment tag is an optical code.

8. The equipment file management system of claim 7, wherein the optical code is a QR code or a bar code that is scannable by the mobile communications device.

9. The equipment file management system of claim 1, wherein the identifier on the equipment tag is a text string that is enterable into an interface on the mobile communications device.

10. The equipment file management system of claim 1, wherein the identifier is readable by the mobile communications device via near-field communications.

11. The equipment file management system of claim 1, wherein the published equipment files comprise at least one equipment drawing.

12. The equipment file management system of claim 11, wherein the equipment drawing comprises at least one interactive 3D model of the piece of industrial equipment.

13. The equipment file management system of claim 11, wherein the request to order at least one replacement part for the identified industrial equipment is based on a selection of a component of the piece of industrial equipment in the interactive 3D model.

14. An equipment file management method, comprising:
maintaining, by an equipment management computing system, a working files data store and a separate published files data store, wherein the working files data store is inaccessible to a mobile communications device operated by a maintenance user, and wherein the published files data store is accessible to the mobile communications device;
automatically moving, by the equipment management computing system, a specific file from the working files data store to the published files data store only after a predetermined holding period has passed since the specific file was designated for release, the predetermined holding period allowing for reversal of the designation for release;
receiving, by the equipment management computing system, an equipment file query from the mobile communications device that is physically positioned proximate to a piece of industrial equipment positioned in an industrial environment, wherein the equipment file query is associated with the piece of industrial equipment and comprises information from a physical equipment tag coupled to the piece of industrial equipment;
identifying, by the equipment management computing system, the piece of industrial equipment based on the information;
based on the identified industrial equipment, electronically providing, by the equipment management computing system, one or more of a plurality of published equipment files from the published files data store to the mobile communications device for display on a graphical user interface, wherein each of the plurality of equipment files provided had previously been published; and
receiving, by the equipment management computing system, an order request from the mobile communications device, wherein the order request identifies at least one replacement part for the identified industrial equipment.

15. The equipment file management method of claim 14, wherein the published equipment files comprise at least one interactive 3D model.

16. The equipment file management method of claim 15, wherein the order request is based on a selection of a component of the piece of industrial equipment in the interactive 3D model.

17. An equipment file management system, comprising:
a plurality of physical equipment tags, wherein each of the plurality of physical equipment tags is coupled to a respective piece of industrial equipment that is positioned within an industrial environment, wherein each of the plurality of equipment tags comprises an identifier associated with the piece of industrial equipment to which it is coupled;

a working equipment file data store maintaining a plurality of working files, wherein the working equipment file data store is inaccessible to a mobile communications device operated by a maintenance user;

a published equipment file data store maintaining a plurality of published files, wherein the published equipment file data store is accessible to the mobile communications device;

a data store maintaining an association of each of the identifiers to one or more of the plurality of published equipment files;

an equipment management computing system in communication with the mobile communications device physically positioned proximate to the piece of industrial equipment and having a graphical user interface, wherein the equipment management computing system is configured to:

automatically move a file from the working equipment file data store to the published equipment file data store only after a predetermined holding period has passed since the file was designated for release, wherein the predetermined holding period allows for reversal of the designation;

receive from the mobile communications device an equipment file query associated with one of the pieces of industrial equipment in the industrial environment, wherein the equipment file query comprises information from the physical equipment tag coupled to the piece of industrial equipment;

identify the piece of industrial equipment based on the information;

based on the identified industrial equipment, electronically provide one or more of the files from the published equipment file data store to the mobile communications device for display on the graphical user interface; and receive from the mobile communications device a request to order at least one replacement part for the identified industrial equipment.

18. The equipment file management system of claim 17, wherein the holding period is greater than 1 day.

* * * * *